United States Patent
Mastrocola et al.

(10) Patent No.: US 12,438,475 B2
(45) Date of Patent: Oct. 7, 2025

(54) PERFORMANCE ENHANCED BRUSHLESS MOTOR WITH VIRTUAL WYE NEUTRAL POINT SWITCHING

(71) Applicant: Hamilton Sundstrand Corporation, Charlotte, NC (US)

(72) Inventors: Naison E. Mastrocola, Goshen, CT (US); Steven A. Avritch, Bantam, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 190 days.

(21) Appl. No.: 18/315,044

(22) Filed: May 10, 2023

(65) Prior Publication Data
US 2024/0380335 A1    Nov. 14, 2024

(51) Int. Cl.
| | |
|---|---|
| H02P 21/22 | (2016.01) |
| H02M 7/487 | (2007.01) |
| H02M 7/5387 | (2007.01) |
| H02P 25/03 | (2016.01) |
| H02P 25/16 | (2006.01) |
| H02P 27/06 | (2006.01) |

(52) U.S. Cl.
CPC ....... *H02M 7/487* (2013.01); *H02M 7/53871* (2013.01); *H02P 21/22* (2016.02); *H02P 25/03* (2016.02); *H02P 25/16* (2013.01); *H02P 27/06* (2013.01)

(58) Field of Classification Search
CPC ............. H02M 7/487; H02M 7/53871; H02M 7/53876; H02P 21/22; H02P 25/03; H02P 25/16; H02P 27/06; H02P 27/08
See application file for complete search history.

(56) References Cited

U.S. PATENT DOCUMENTS

| | | |
|---|---|---|
| 6,469,461 B1 | 10/2002 | Konda et al. |
| 7,489,097 B2 | 2/2009 | Fu et al. |
| 8,212,504 B2 | 7/2012 | Ogahara |
| 9,692,331 B2 | 6/2017 | Brown |

(Continued)

FOREIGN PATENT DOCUMENTS

JP    7031180 B2    2/2022

OTHER PUBLICATIONS

European Search Report for Application No. 24169213.6, mailed Sep. 17, 2024, 8 pages.

*Primary Examiner* — Muhammad S Islam
(74) *Attorney, Agent, or Firm* — CANTOR COLBURN LLP (57) ABSTRACT

A motor drive system includes a three-phase motor and a virtual neutral bridge inverter circuit. The three-phase motor includes a first phase lead, a second phase lead, and a third phase lead. Each of the first phase neutral end, the second phase neutral end, and the third phase neutral end of the phase leads are separated from one another. The virtual neutral bridge inverter circuit includes a first neutral switch pair connected at a first neutral connection node, a second neutral switch pair connected at a second neutral connection node, and a third neutral switch pair connected at a third neutral connection node. The first phase neutral end is connected to the first neutral connection node, the second phase neutral end is connected to the second neutral connection node, and the third phase neutral end is connected to the third neutral connection node.

14 Claims, 12 Drawing Sheets

(56) References Cited

U.S. PATENT DOCUMENTS

| | | | |
|---|---|---|---|
| 11,165,374 | B2 | 11/2021 | Yokoo |
| 11,251,734 | B2 | 2/2022 | Sega |
| 2012/0249034 | A1 | 10/2012 | Dooley |
| 2013/0285586 | A1 | 10/2013 | Koda et al. |
| 2015/0194902 | A1* | 7/2015 | Tian .................... H02M 7/4833 363/37 |
| 2016/0028341 | A1* | 1/2016 | White ..................... H02P 27/06 318/494 |
| 2016/0254783 | A1* | 9/2016 | Unru ....................... H02S 50/00 324/658 |
| 2018/0056793 | A1* | 3/2018 | Rozman ................. B60L 50/13 |
| 2018/0278141 | A1* | 9/2018 | Hasegawa ................ H02J 3/01 |
| 2020/0028448 | A1* | 1/2020 | Kshirsagar ............ H02M 7/487 |
| 2021/0159803 | A1* | 5/2021 | Waghmare ........... H01F 27/2804 |
| 2021/0362606 | A1* | 11/2021 | White ................. H02M 1/0074 |
| 2022/0069757 | A1* | 3/2022 | Berry ..................... H02P 27/06 |
| 2023/0063318 | A1 | 3/2023 | Lee et al. |
| 2023/0179137 | A1* | 6/2023 | Faedo .................... H02P 27/08 318/490 |

* cited by examiner

| Inverter Binary State [xxx] | Inverter State Name | Conducting IGBT | | | Phase Voltage | | |
|---|---|---|---|---|---|---|---|
| | | Phase A | Phase B | Phase C | VphA | VphB | VphC |
| 000 | V0 | Lower | Lower | Lower | -VDC/2 | -VDC/2 | -VDC/2 |
| 001 | V1 | Lower | Lower | Upper | -VDC/2 | -VDC/2 | +VDC/2 |
| 010 | V2 | Lower | Upper | Lower | -VDC/2 | +VDC/2 | -VDC/2 |
| 011 | V3 | Lower | Upper | Upper | -VDC/2 | +VDC/2 | +VDC/2 |
| 100 | V4 | Upper | Lower | Lower | +VDC/2 | -VDC/2 | -VDC/2 |
| 101 | V5 | Upper | Lower | Upper | +VDC/2 | -VDC/2 | +VDC/2 |
| 110 | V6 | Upper | Upper | Lower | +VDC/2 | +VDC/2 | -VDC/2 |
| 111 | V7 | Upper | Upper | Upper | +VDC/2 | +VDC/2 | +VDC/2 |

| Inverter Binary Name [xxx][yyy] | Inverter State Name | Conducting IGBT | | | | | | Phase Voltages | | | | | |
|---|---|---|---|---|---|---|---|---|---|---|---|---|---|
| | | Phase A | Phase B | Phase C | Phase A Neutral | Phase B Neutral | Phase C Neutral | Phase A | Phase B | Phase C | Phase A' | Phase B' | Phase C' |
| [000][000] | V0:0 | Lower | Lower | Lower | Lower | Lower | Lower | -VDC/2 | -VDC/2 | -VDC/2 | -VDC/2 | -VDC/2 | -VDC/2 |
| [001][110] | V1:6 | Lower | Lower | Upper | Lower | Upper | Lower | -VDC/2 | -VDC/2 | VDC/2 | -VDC/2 | VDC/2 | -VDC/2 |
| [010][101] | V2:5 | Lower | Upper | Lower | Upper | Lower | Lower | -VDC/2 | VDC/2 | -VDC/2 | VDC/2 | -VDC/2 | -VDC/2 |
| [011][100] | V3:4 | Lower | Upper | Upper | Lower | Lower | Upper | -VDC/2 | VDC/2 | VDC/2 | -VDC/2 | -VDC/2 | VDC/2 |
| [100][011] | V4:3 | Upper | Lower | Lower | Lower | Upper | Upper | VDC/2 | -VDC/2 | -VDC/2 | -VDC/2 | VDC/2 | VDC/2 |
| [101][010] | V5:2 | Upper | Lower | Upper | Lower | Lower | Upper | VDC/2 | -VDC/2 | VDC/2 | -VDC/2 | -VDC/2 | VDC/2 |
| [110][001] | V6:1 | Upper | Upper | Lower | Upper | Upper | Lower | VDC/2 | VDC/2 | -VDC/2 | VDC/2 | VDC/2 | -VDC/2 |
| [111][111] | V7:7 | Upper | Upper | Upper | Upper | Upper | Upper | VDC/2 | VDC/2 | VDC/2 | VDC/2 | VDC/2 | VDC/2 |

PERFORMANCE ENHANCED BRUSHLESS MOTOR WITH VIRTUAL WYE NEUTRAL POINT SWITCHING

BACKGROUND

The present disclosure relates to aircraft electrical systems, and more particularly, to a direct current (DC) synchronous motor operable to drive electro-mechanical actuators.

Aircrafts are known to employ motor-driven electro-mechanical actuators are utilized as a solution to operate various aircraft applications. The motor is typically implemented as a brushless DC synchronous motor which operates to drive one or more actuators. However, the performance of the aircraft application operated by the actuator is based on the supply voltage delivered to the motor, which can dip to low levels. At low voltage, winding resistance cannot be overcome to drive enough current needed to suitably drive the motor, thereby causing reduced performance. Some brushless DC synchronous motors implement multi-filar windings, which are a type of coil winding that uses multiple filaments to wind around a spinning mandrel and produce multi-filar micro coils with up to 4 filars (sometimes referred to as threads). Multi-filar windings, however, can include open circuits in some of the strands which are difficult to detect during operation of a wye connected motor with buried neutral.

BRIEF DESCRIPTION

According to a non-limiting embodiment, a motor drive system includes a three-phase motor and a virtual neutral bridge inverter circuit. The three-phase motor includes a first phase lead including a first phase input end and a first phase neutral end, a second phase lead including a second phase input end and a second phase neutral end, and a third phase lead including a third phase input end and a third phase neutral end. Each of the first phase neutral end, the second phase neutral end, and the third phase neutral end separated from one another. The virtual neutral bridge inverter circuit includes a first neutral switch pair connected at a first neutral connection node, a second neutral switch pair connected at a second neutral connection node, and a third neutral switch pair connected at a third neutral connection node. The first phase neutral end is connected to the first neutral connection node, the second phase neutral end is connected to the second neutral connection node, and the third phase neutral end is connected to the third neutral connection node.

In addition to one or more of the features described above, or as an alternative, in further embodiments the virtual neutral bridge inverter circuit further includes a first input lead switch pair connected at a first input connection node, a second input lead switch pair connected at a second input connection node, and a third second input lead switch pair connected at a third input connection node.

In addition to one or more of the features described above, or as an alternative, in further embodiments the first phase input end is connected to the first input connection node, the second phase input end is connected to the second input connection node, and the third phase input end is connected to the third input connection node.

In addition to one or more of the features described above, or as an alternative, in further embodiments the virtual neutral bridge inverter circuit operates according to a dual-space vector modulation scheme.

In addition to one or more of the features described above, or as an alternative, in further embodiments the dual-space vector modulation scheme includes a first binary set that controls the first, second and third input lead switch pairs, and a second binary set that controls the first, second, and third neutral switch pairs.

In addition to one or more of the features described above, or as an alternative, in further embodiments a controller in signal communication with the virtual neutral bridge inverter circuit and configured to output one or more control signals based on the first binary set and the second binary set. The one or more control signals are configured to control the on/off switching times of the first, second, and third input lead switch pairs and the first, second, and third neutral switch pairs.

In addition to one or more of the features described above, or as an alternative, in further embodiments the first, second, and third neutral switch pairs are configured to be controlled independently from the first, second and third input lead switch pairs.

In addition to one or more of the features described above, or as an alternative, in further embodiments the virtual neutral bridge inverter circuit is configured to receive a DC link voltage. The first, second, and third neutral switch pairs are configured to be actively controlled such that a full amount of the DC link voltage is applied simultaneously across each of the first, second and third phase leads.

According to another non-limiting embodiment, a virtual neutral bridge inverter circuit configured to control a three-phase motor is provided. The virtual neutral bridge inverter circuit comprises a first neutral switch pair connected at a first neutral connection node, a second neutral switch pair connected at a second neutral connection node, and a third neutral switch pair connected at a third neutral connection node. The first neutral connection node is configured to establish electrical connection with a first phase neutral end of a first phase lead included in the three-phase motor. The second neutral connection node is configured to establish electrical connection with a second phase neutral end of a second phase lead included in the three-phase motor. The third neutral connection node is configured to establish electrical connection with a third phase neutral end of a third phase lead included in the three-phase motor.

In addition to one or more of the features described above, or as an alternative, in further embodiments the virtual neutral bridge inverter circuit further comprises a first input lead switch pair connected at a first input connection node, a second input lead switch pair connected at a second input connection node, and a third second input lead switch pair connected at a third input connection node.

In addition to one or more of the features described above, or as an alternative, in further embodiments the first input connection node is configured to establish electrical connection with a first input lead end of the first phase lead, the second input connection node is configured to establish electrical connection with a second input lead end of the second phase lead, and the third input connection node is configured to establish electrical connection with a third input lead end of the third phase lead.

In addition to one or more of the features described above, or as an alternative, in further embodiments the virtual neutral bridge inverter circuit is configured to operate according to a dual-space vector modulation scheme.

In addition to one or more of the features described above, or as an alternative, in further embodiments the dual-space vector modulation scheme includes a first binary set that controls the first, second and third input lead switch pairs, and a second binary set that controls the first, second, and third neutral switch pairs.

In addition to one or more of the features described above, or as an alternative, in further embodiments the first, second, and third neutral switch pairs are configured to be controlled independently from the first, second and third input lead switch pairs.

In addition to one or more of the features described above, or as an alternative, in further embodiments the virtual neutral bridge inverter circuit is configured to receive a DC link voltage. The first, second, and third neutral switch pairs are configured to be actively controlled such that a full amount of the DC link voltage is applied simultaneously across each of the first, second and third phase leads.

According to yet another non-limiting embodiment, a method of controlling a three-phase motor is provided. The method comprises establishing a virtual neutral bridge including a plurality of input lead switch pairs and a plurality of neutral switch pairs. The method further comprises connecting first, second and third phase leads of the three-phase motor to the plurality of input lead switch pairs and the plurality of neutral switch pairs. The connection between the plurality neutral switch pairs and the first, second and third phase leads establishes a virtual neutral connection of the three-phase motor. The method further comprises delivering a DC link voltage to the virtual neutral bridge inverter circuit, and controlling the plurality of neutral switch pairs independently from the plurality of input lead switch pairs such that a full amount of the DC link voltage is applied simultaneously across each of the first, second and third phase leads.

In addition to one or more of the features described above, or as an alternative, in further embodiments establishing the inverter further comprises connecting a first neutral switch pair together to establish a first neutral connection node, connecting a second neutral switch pair together to establish a second neutral connection node, and connecting a third neutral switch pair together to establish a third neutral connection node; connecting a first input lead switch pair together to establish a first input connection node, connecting a second input lead switch pair together to establish a second input connection node, and connecting a third input lead switch pair together to establish a third input connection node; connecting a first phase neutral end of the first phase lead to the first neutral connection node, connecting a second phase neutral end of the second phase lead to the second neutral connection node, and connecting a third phase neutral end of the third phase lead to the third neutral connection node; and connecting a first phase input end of the first input lead to the first input connection node, connecting a second phase input end of the second phase lead to the second input connection node, and connecting a third phase input end of the third phase lead to the third input connection node.

In addition to one or more of the features described above, or as an alternative, in further embodiments the method further comprises operating the virtual neutral bridge inverter circuit according to a dual-space vector modulation scheme.

In addition to one or more of the features described above, or as an alternative, in further embodiments the dual-space vector modulation scheme includes a first binary set that controls the first, second and third input lead switch pairs, and a second binary set that controls the first, second, and third neutral switch pairs.

In addition to one or more of the features described above, or as an alternative, in further embodiments one or more of the binary values included in the first binary set and one or more binary values of the second binary set can be independently varied with respect to one another.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The example embodiments disclosed herein are illustrative of a hyperloop environmental control system, and assemblies of the present disclosure and methods/techniques thereof. It should be understood, however, that the disclosed embodiments are merely examples of the present disclosure, which may be embodied in various forms. Therefore, details disclosed herein with reference to example hyperloop environmental control systems and associated processes/techniques of fabrication/assembly and use are not to be interpreted as limiting, but merely as the basis for teaching one skilled in the art how to make and use the systems/assemblies and/or alternative systems/assemblies of the present disclosure.

Non-limiting embodiments of the present disclosure provide a motor drive system that includes a virtual neutral bridge inverter circuit configured to drive a three-phase wye motor winding having a virtual wye neutral point. Unlike traditional wye motors that employ a common neutral wye that is buried in the motor, the three-phase wye motor according to one or more non-limiting embodiments provides three individual neutral connections that are drawn out from the motor and returned to the virtual neutral bridge inverter circuit where they are connected to individual dedicated neutral switches.

In one or more non-limiting embodiments, the virtual neutral bridge inverter circuit is implemented as a three-phase half-bridge inverter that includes three additional switch pairs dedicated to the three neutral wires of the motor. The virtual neutral bridge inverter circuit also includes dedicated current sensors that measure current follow through the neutral wire connections, respectively. The connections of the neutral motor wires and the virtual neutral bridge inverter allows for actively controlling the switching applied to the neutral wire connections based on a low quiescent (Iq) current command, which allows for simultaneously use of the full direct current (DC) link voltage across each phase (e.g., each of the first, second and third phase leads) to increase the amount of current (e.g., twice the amount) delivered through the motor. Accordingly, torque output from the motor is increased (e.g., double the torque) and increased force is produced by the actuator without the need to increase the input voltage to motor drive system. In addition, the added neutral wire current sensors can improve phase resistance imbalance detection, and ensure current flow through the motor is balanced even though the neutral wires are not connected to a common neutral point in the motor.

In a scenario where the supply voltage is low, for example, the full DC link can be used and the neutral point of the motor is made "virtual". In this manner, current summing into the neutral node can be actively controlled to maintain a balanced electromagnetic field in the motor which in turn reduces losses and improves operating efficiency. In the event of a winding fault during operation, the additional ambiguity reduction and active detection capability that is achieved by having neutral current measurements allows for flagging or alerting of a component degradation prior to an intermittent built-in-test (iBIT) or power-up BIT.

The term "about" is intended to include the degree of error associated with measurement of the particular quantity based upon the equipment available at the time of filing the application.

Figure 1:
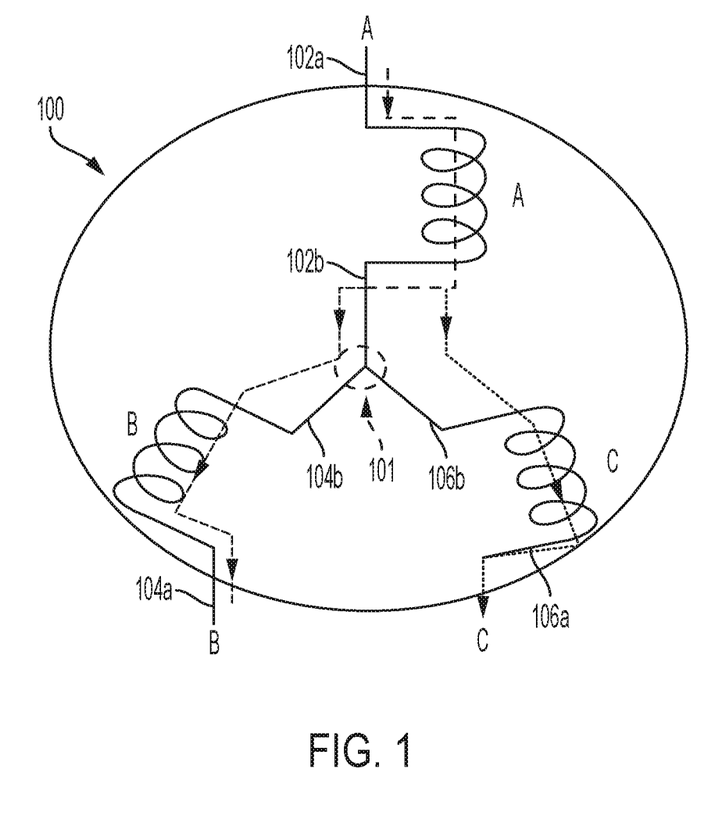
FIG. 1 depicts a traditional three-phase wye motor having a buried common wye neutral point.

Turning now to FIG. 1, a traditional direct current (DC) brushless synchronous motor 100 is illustrated. The DC brushless synchronous motor 100 implements a traditional three-phase wye configuration (also referred to as a "star configuration"). Accordingly, the motor 100 includes a first phase lead (A) including a first phase input 102a and a first phase neutral 102b, a second phase lead (B) including a second phase input 104a and a second phase neutral 104b, and a third phase lead (C) including a third phase input 106a and a third phase neutral 106b. The traditional three-phase wye motor 100 further includes wye neutral point 101 to which all three neutrals 102b, 104b and 106b are commonly connected.

Figure 2:
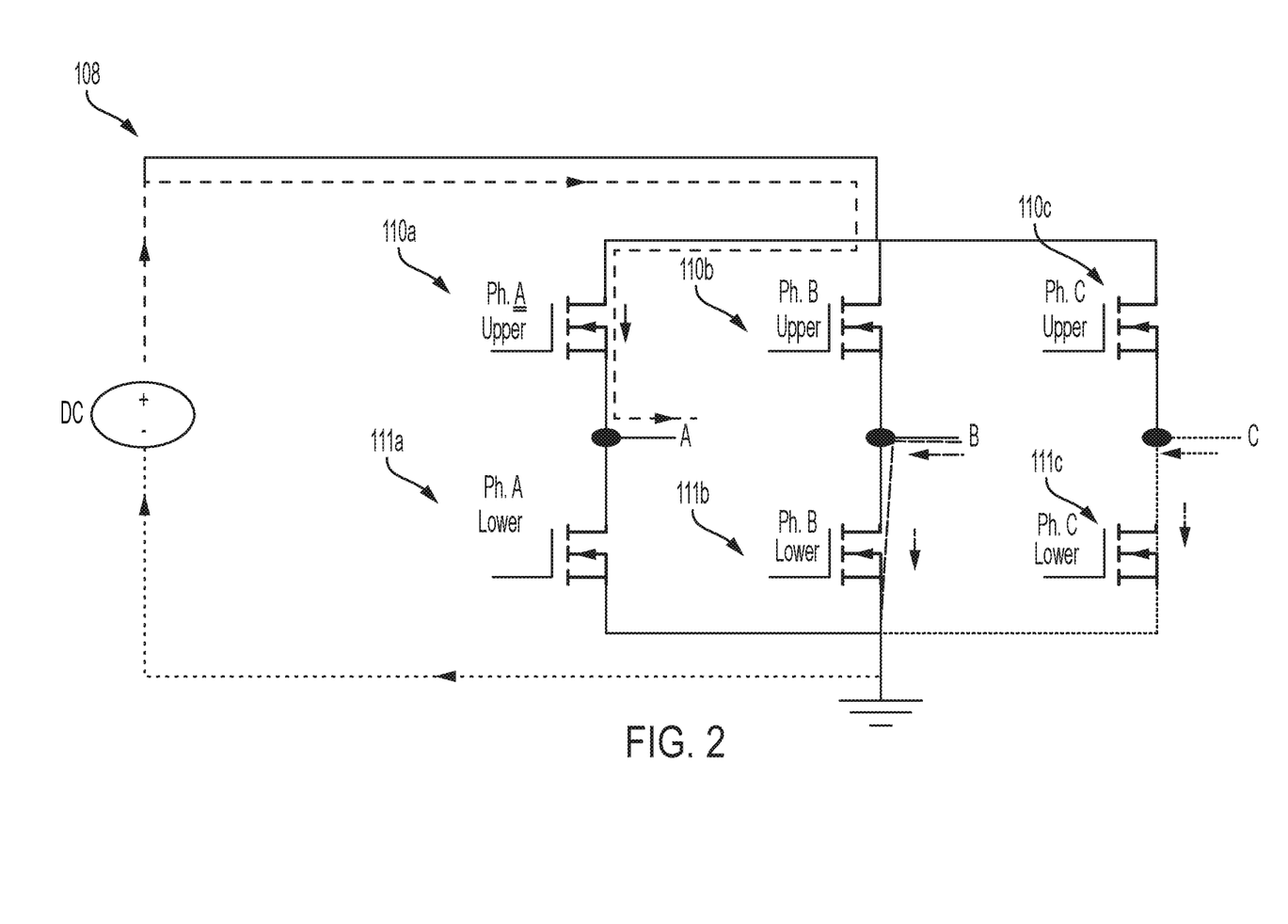
FIG. 2 is schematic diagram of a traditional bridge inverter circuit configured to drive the traditional three-phase wye motor shown in FIG. 1.
Figure 3:
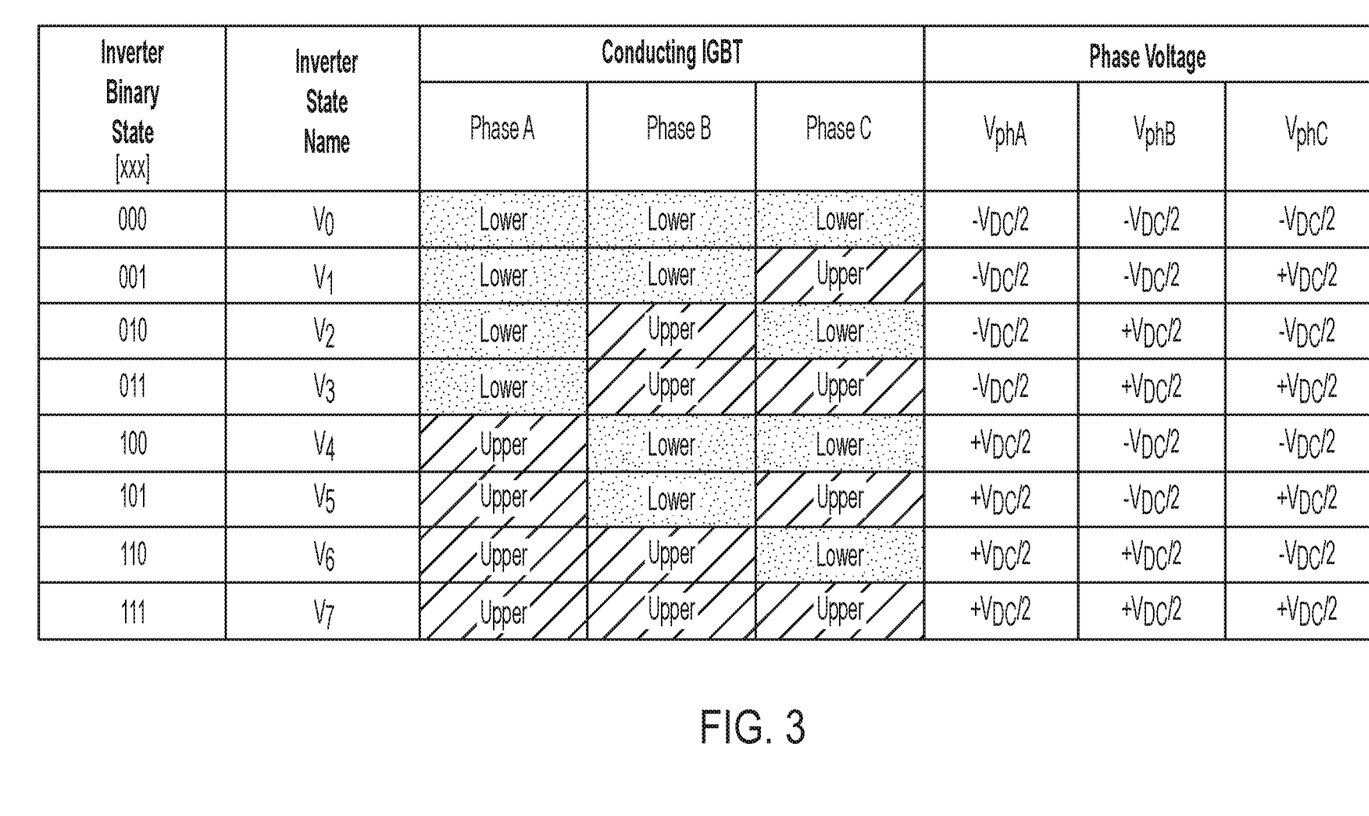
FIG. 3 depicts a table describing the binary states of the traditional bridge inverter circuit illustrated in FIG. 2.

The motor 100 is connected to a traditional inverter 108 shown in FIG. 2. The traditional bridge inverter circuit 108 is implemented as an H-bridge circuit which includes individual switches 110a/111a, 110b/111b, 110c/111c that correspond to a respective phase (PhA, PhB and PhC) of the three-phase motor 100 and that are individual controlled and switched using a controller (not shown) according to a switch timing scheme to drive the motor 100. The switch timing scheme can involve assigning a single set of binary states [xxx] (also referred to as a space vector modulation (SVM) scheme) to the eight operating states ($V_n$) of the traditional inverter circuit 108 as expressed, for example, in Table 1 illustrated in FIG. 3.

Figure 4:
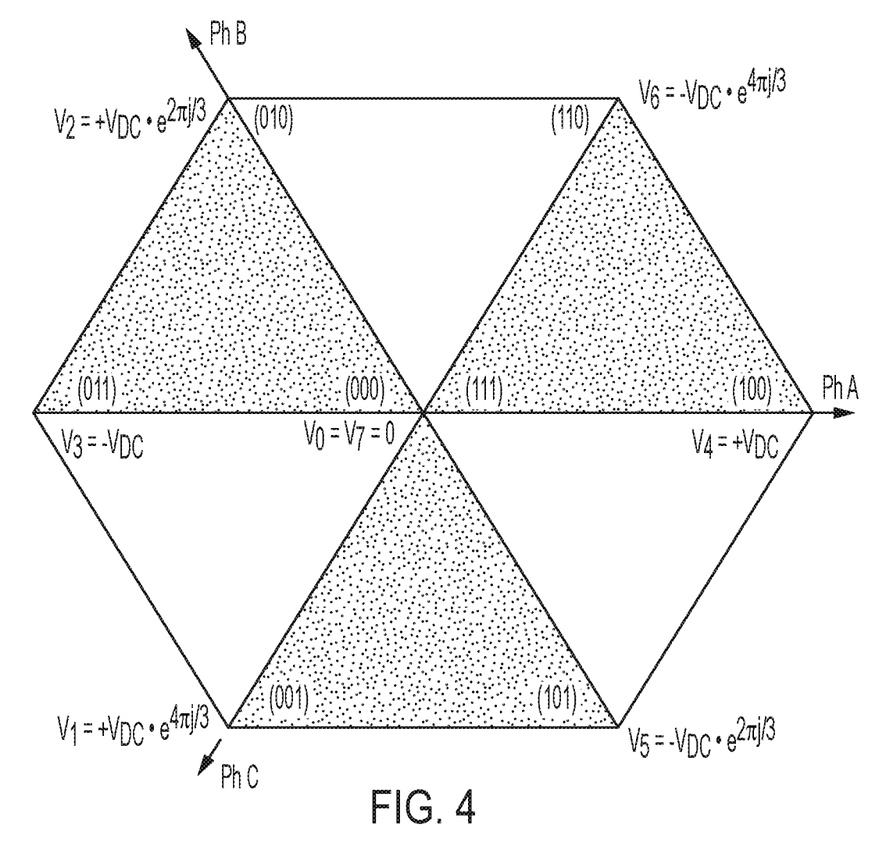
FIG. 4 is a quadrant diagram illustrating the resulting output voltage of the traditional bridge inverter circuit shown in FIG. 2.

Thus, the switch timing scheme controls the on/off switching times of the individual switches, which in turn controls current flow through the different stages (PhA_Upper/PhA_Lower, PhB_Upper/PhB_Lower, and PhC_Upper/PhC_Lower) of the inverter circuit 108 and leads of the (A, B, C) of the motor 100. The resulting output voltage of the traditional bridge inverter circuit 108 is expressed in the quadrant diagram illustrated in FIG. 4, and can be expressed according to equation 1 below.

$$V_{out} = V_{phA} + V_{phB} \cdot e^{j\frac{2\pi}{3}} + V_{phC} \cdot e^{j\frac{4\pi}{3}} \qquad \text{Eq. 1}$$

Figure 5A:
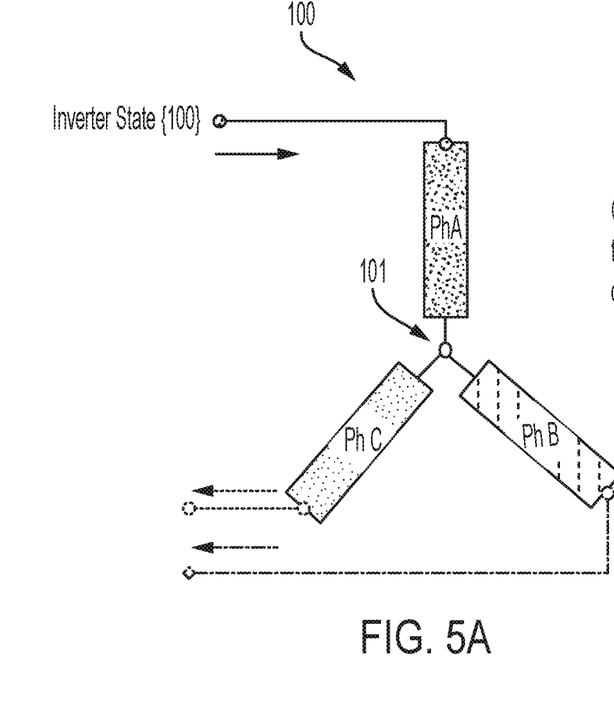
FIG. 5A depicts current flow through a traditional three-phase wye motor while the traditional bridge inverter circuit operates in a first state.
Figure 5B:
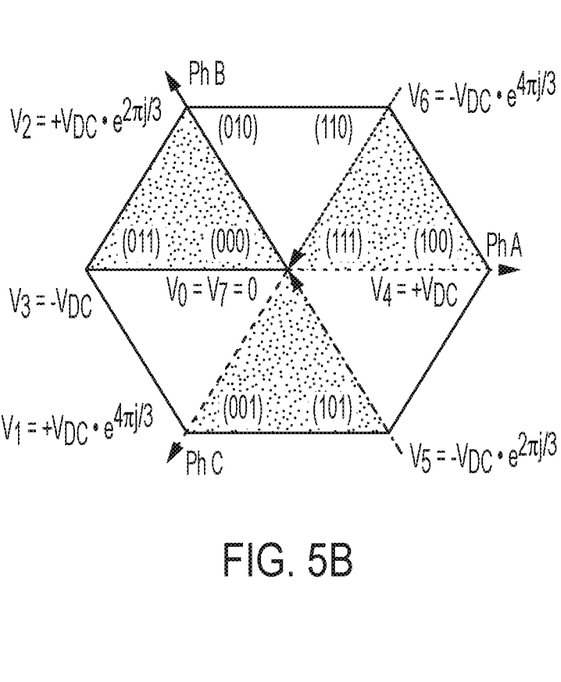
FIG. 5B depicts a quadrant diagram illustrating the resulting output voltage of the traditional bridge inverter circuit while operating in the first state shown in FIG. 5A.

FIG. 5A, for example, depicts current flow through a traditional wye motor 100 while the traditional inverter circuit 108 operates in a first basic vector state (e.g., "100"). Accordingly, current flows through the PhA lead, through the common motor neutral point 101, and out of the PhB and PhC leads. The resulting output voltage of the inverter circuit 108 operating in the first basic vector state (e.g., 100) is illustrated in the quadrant diagram shown in FIG. 5B.

Figure 6A:
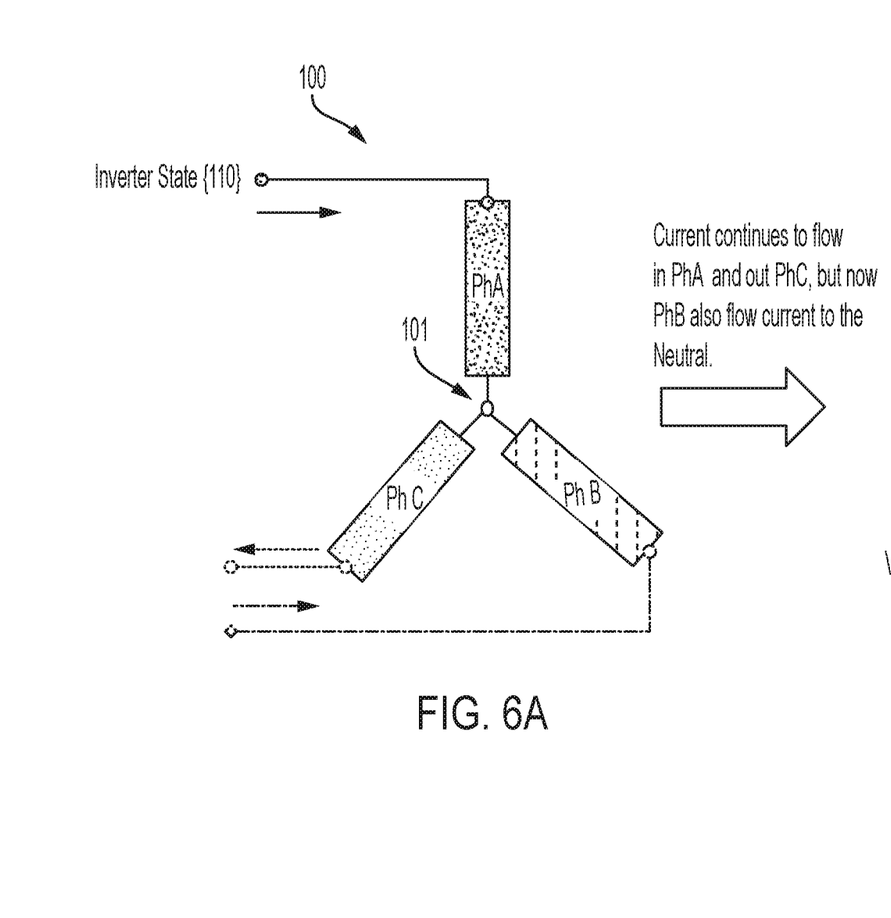
FIG. 6A depicts current flow through a traditional three-phase wye motor while the traditional bridge inverter circuit operates in a second state.
Figure 6B:
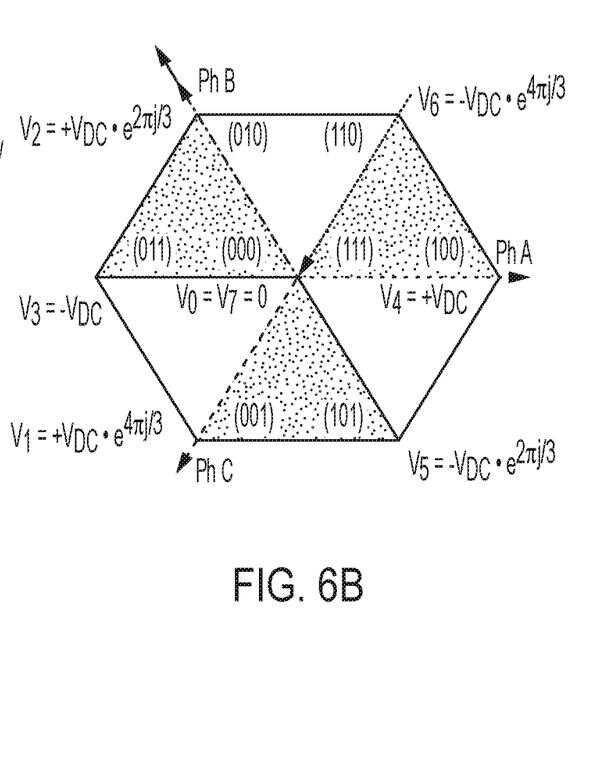
FIG. 6B depicts a quadrant diagram illustrating the resulting output voltage of the traditional bridge inverter circuit while operating in the second state shown in FIG. 6A.

Another example illustrated in FIG. 6A, shows current flow through the traditional wye motor 100 while the traditional inverter circuit 108 operates in a second basic vector state (e.g., "110"). In this scenario, current continues to flow through the PhA lead and out of the PhC lead, but now the PhB lead flows current to the common motor neutral point 101. The resulting output voltage of the inverter circuit 108 operating in the first basic vector state (e.g., 100) is illustrated in the quadrant diagram shown in FIG. 6B.

As described above, the common wye neutral connection of the traditional DC brushless synchronous motor 100 is limited by Ohms Law in terms of the ability to vary the amount of current through the motor 100 given a fixed input power source, which is the case on aircraft systems. Therefore, the solution to increase the amount of current through a motor in an aircraft system is to reduce the impedance of the motor by increasing the size of the wye coils. However, increasing coil size is an undesirable solution in aircraft application as it would add weight and cost to the aircraft.

Figure 7:
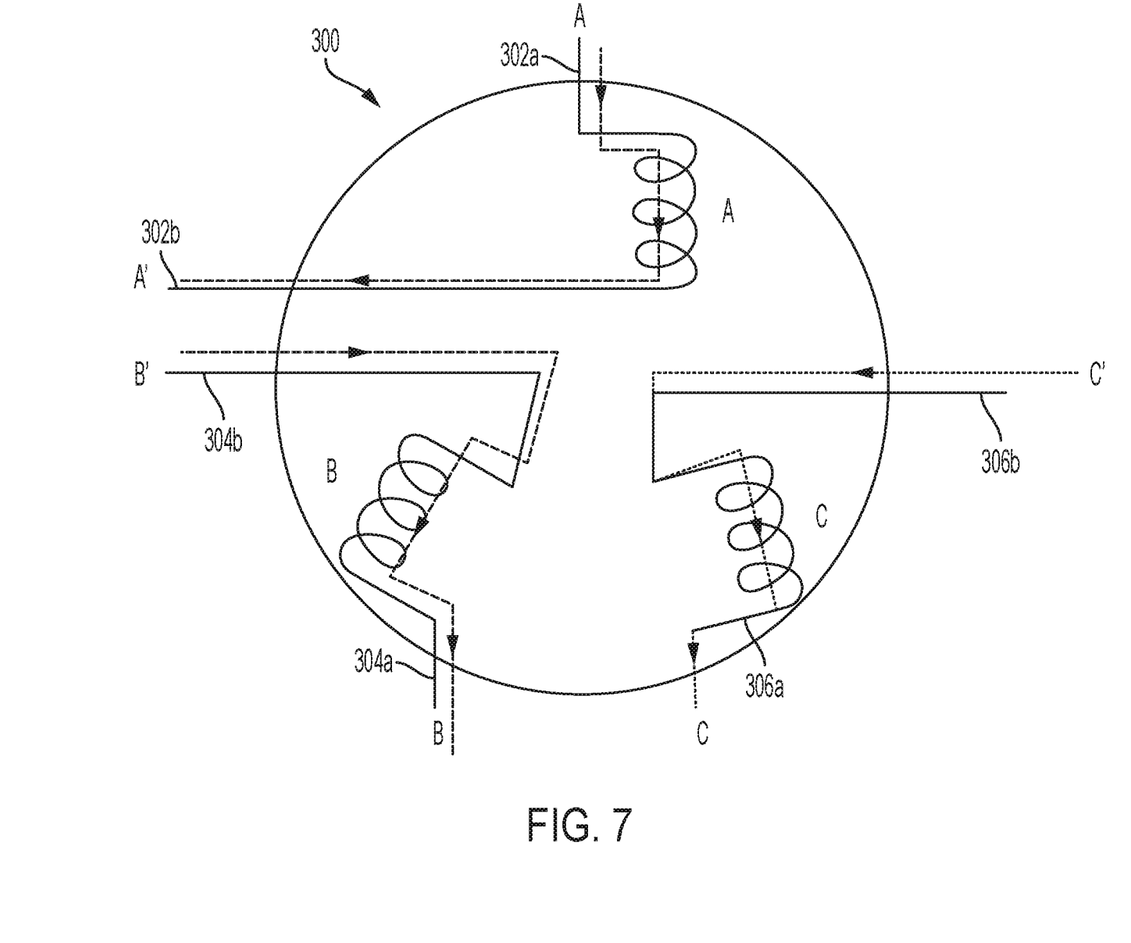
FIG. 7 depicts a three-phase wye motor winding having a virtual wye neutral point according to a non-limiting embodiment of the present disclosure.

Turning now to FIG. 7, a performance enhanced DC brushless synchronous motor 300 is illustrated according to a non-limiting embodiment of the present disclosure. The performance enhanced DC brushless synchronous motor 300 has an "open wye" configuration, where the neutral leads 302b, 304b, and 306b are physically separated and decoupled from one another so that they can be independent controlled. The performance enhanced DC brushless synchronous motor 300 includes a first phase lead (A) including a first phase input end 302a and a first phase neutral end 302b, a second phase lead (B) including a second phase input end 304a and a second phase neutral end 304b, and a third phase lead (C) including a third phase input end 306a and a third phase neutral end 306b. Each of the neutral lead ends 302b, 304b, and 306b are physically decoupled from one another to establish an "open wye" configuration, which allows the neutral leads 302b, 304b, and 306b to be independently controlled. That is unlike the traditional three-phase wye motor which implements a buried common wye neutral point, the performance enhanced three-phase wye motor 300 described herein operates according to a virtual wye neutral point 302 that is established by a virtual neutral bridge inverter circuit 308 shown in FIG. 8.

Figure 8:
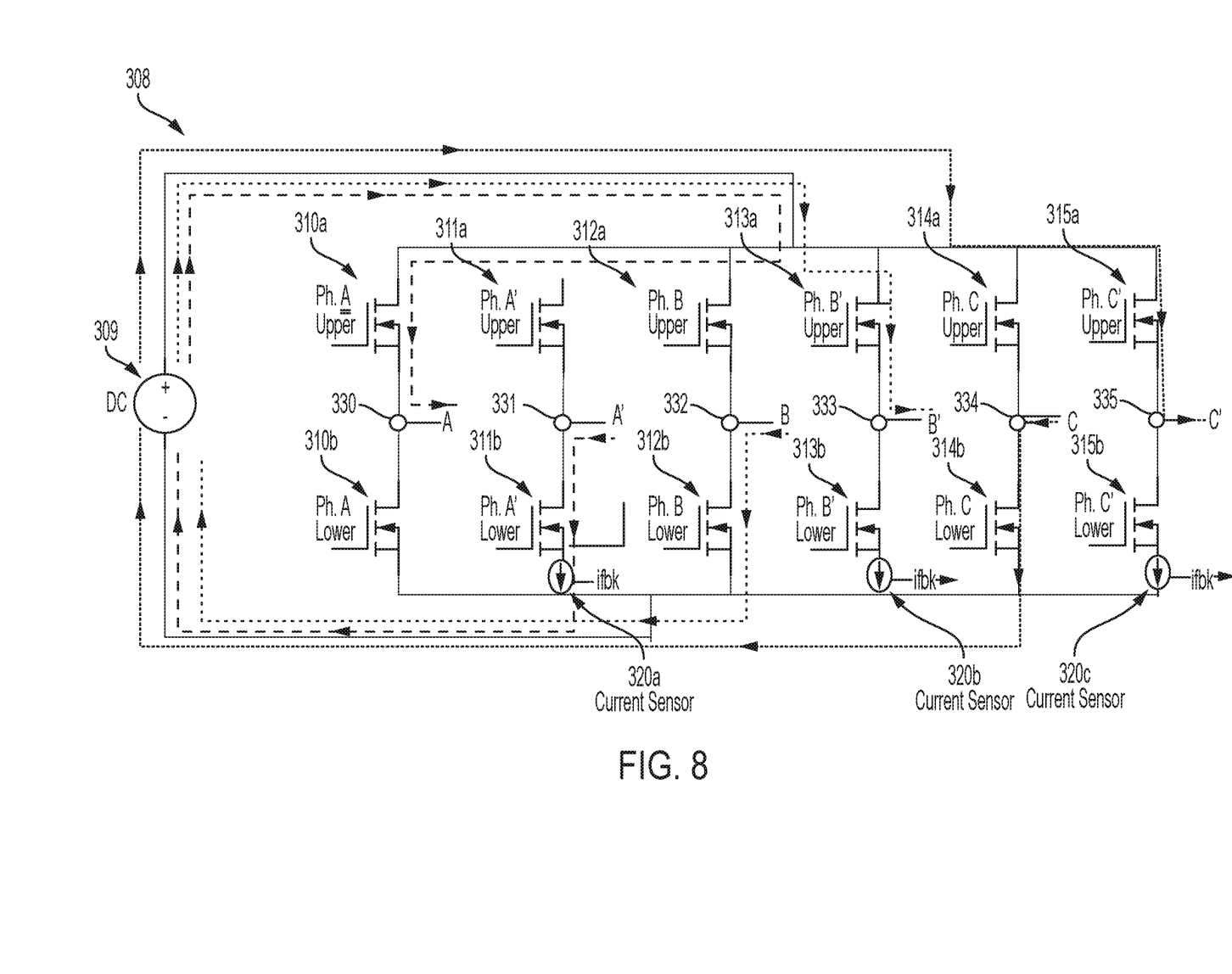
FIG. 8 is schematic diagram of a virtual neutral bridge inverter circuit configured to drive the three-phase wye motor winding shown in FIG. 7 according to a non-limiting embodiment of the present disclosure.

The virtual neutral bridge inverter circuit 308 is implemented as an H-bridge circuit which includes individual switches 310a/310b, 311a/311b, 312a/312b, 313a/313b, 314a/314b, and 315a/315b. Switches 310a/310b establish a first input lead switch pair connected at a first input connection node 330, switches 311a/311b establish a first neutral switch pair connected at a first neutral connection node 331, switches 312a/312b establish a second input lead switch pair connected at a second input connection node 332, switches 313a/313b establish a second neutral switch pair connected at a second neutral connection node 333, switches 314a/314b establish a third second input lead switch pair connected at a third input connection node 334, and switches 315a/315b establish a third neutral switch pair connected at a third neutral connection node 335. Accordingly, input lead switches 310a/310b, 312a/312b, 314a/314b correspond to the input lead ends 302a, 304a and 306a of a respective phase (PhA, PhB and PhC), while neutral lead switches 311a/311b, 313a/313b, and 315a/3156b correspond to the neutral lead ends 302b, 304b and 306b of a respective phase (PhA, PhB and PhC). For example, the first phase input end 302a is connected to the first input connection node 330, the second phase input end 304a is connected to the second input connection node 332, and the third phase input end 306a is connected to the third input connection node 334. Likewise, the first phase neutral end 302b is connected to the first neutral connection node 331, the second phase neutral end 304b is connected to the second neutral connection node 333, and the third phase neutral end 306b is connected to the third neutral connection node 335.

Each of the switches 310a/310b, 311a/311b, 312a/312b, 313a/313b, 314a/314b, and 315a/315b are individual controlled and switched using a controller (not shown) according to a switch timing scheme to drive the motor 300. Unlike a traditional inverter 108 used to drive a traditional three-phase wye DC motor, the virtual neutral bridge inverter circuit 308 implements additional neutral lead switches 311a/311b, 313a/313b, and 315a/3156b, which can be independent control the neutral leads 302b, 304b and 306b of the performance enhanced motor 300. Accordingly, a virtual neutral can be established, and the current through the virtual neutral can be actively controlled via the controller.

In one or more non-limiting embodiments, the virtual neutral bridge inverter circuit 308 includes current sensors 320a, 320b and 320c. The current sensors 320a, 320b and 320c can be coupled to respective neutral stages (PhA', PhB', PhC') of the inverter 308 to monitor current flow through the respective neutral leads 302b, 304b and 306b connected thereto. Torque delivered by a motor is expressed as a function of current * Kt (where Kt is the motor torque constant). The higher the current, the more torque produced by the motor. In the traditional arrangement provided by the traditional direct current (DC) brushless synchronous motor 100, the maximum voltage across any phase would be ½ of the total bus voltage since the voltage is split between the phases. As a result, less voltage leads to less current and therefore less torque. Unlike the performance provided by the traditional direct current (DC) brushless synchronous motor 100, the total available bus voltage of the performance enhanced motor 300 is applied across each phase, thereby providing 2X the electrical current compared to traditional arrangement. The 2X electrical current results in 2X the toque output compared to traditional arrangement).

Accordingly, the neutral lead switches 311a/311b, 313a/313b, and 315a/3156b can be controlled to control current flow through the neutral leads 302b, 304b and 306b based on an Iq current command output from the controller, which in turn allows for simultaneously use of the full DC link voltage across each phase of the motor 300 (e.g., of the first, second and third phase leads PhA, PhB, and PhC). The current sensors 320a, 320b and 320c can also be utilized by the controller to actively detect over-current rush, and in turn generate a flag or alert indicting component degradation and/or circuit fault prior to an intermittent built-in-test (iBIT) or power-up BIT.

In one or more non-limiting embodiments, the controller can monitor the supply voltage 309 and determine when it falls below a voltage threshold. When it falls below the voltage threshold, the controller can vary the switch timings of the virtual neutral bridge inverter circuit 308 to adjust current flow through the motor 300, while monitoring the current flow output from the neutral lead switches 311a/311b, 313a/313b. In this manner, when the supply voltage 309 is low (e.g., below the voltage threshold), the full DC link can be used while ensuring current flow through the virtual neutral is balanced (e.g., to satisfy Ohms Law).

Figure 9:
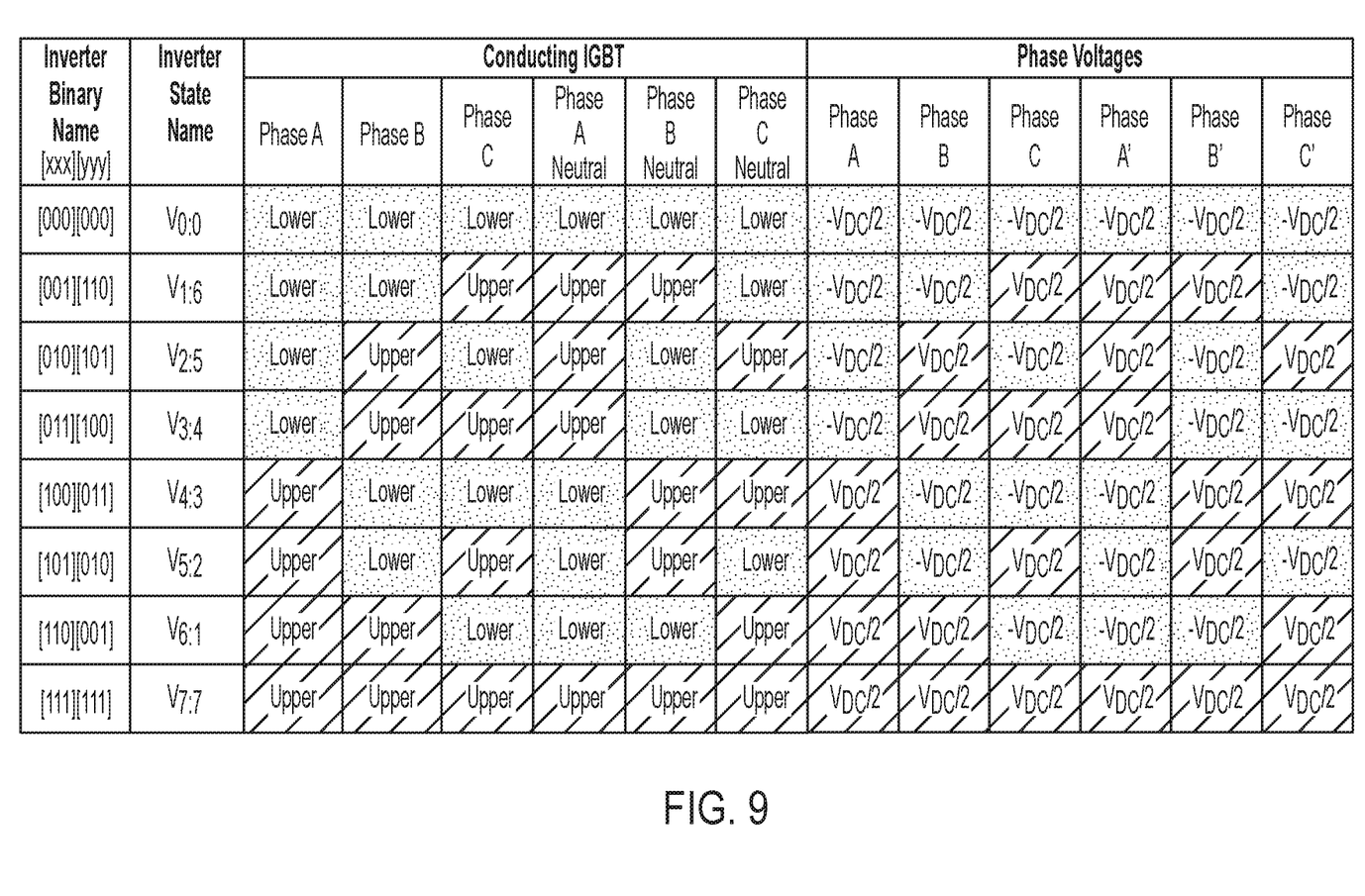
FIG. 9 depicts a table describing the binary states of the virtual neutral bridge inverter circuit illustrated in FIG. 8 according to a non-limiting embodiment of the present disclosure.

The switch timing scheme can involve assigning binary states (also referred to as a space vector modulation (SVM) scheme) to the eight operating states ($V_{n:m}$) of the virtual neutral bridge inverter circuit 308. Unlike the traditional inverter 108, the virtual neutral bridge inverter circuit 308 of the present disclosure operates according to a dual-space vector modulation (SVM) scheme, i.e., two binary sets ([xxx] [yyy]) as depicted, for example, in Table 2 illustrated FIG. 9. The first binary set ([xxx]) controls the input lead switch pairs 310a/310b, 312a/312b, 314a/314b, while the second binary set ([yyy]) controls the neutral switch pairs 311a/311b, 313a,/13b, 315a/315b.

Figure 10:
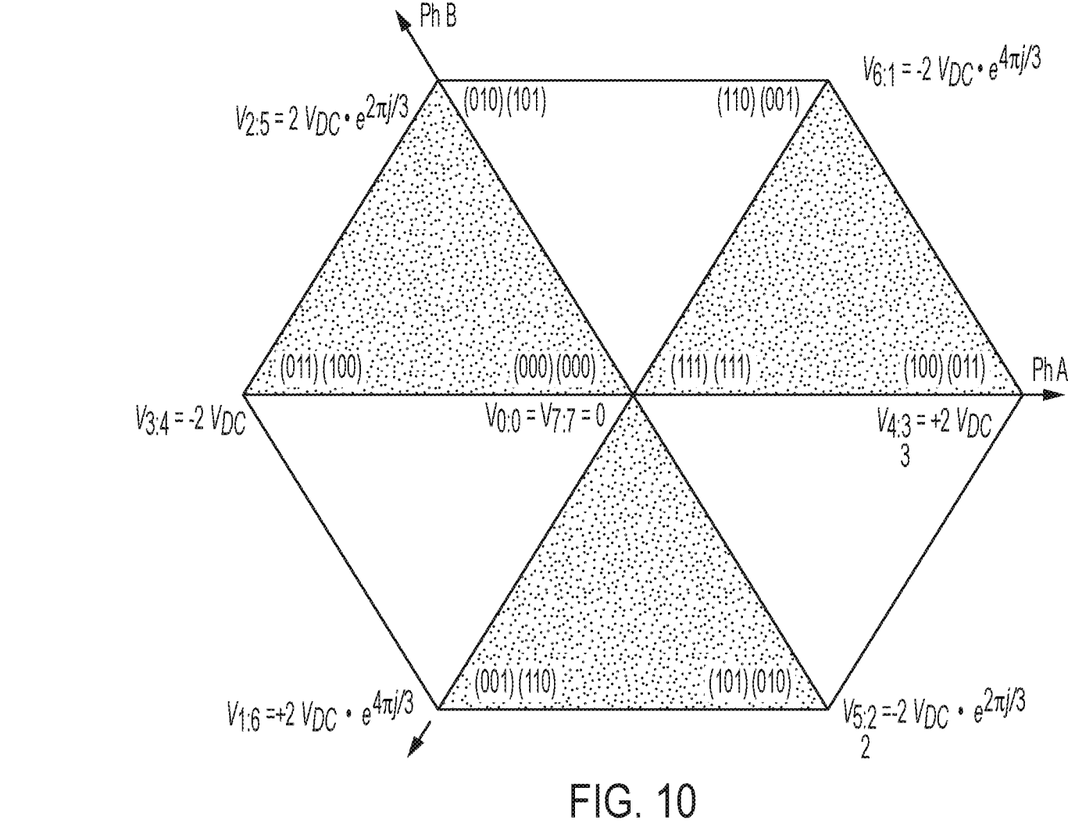
FIG. 10 is a quadrant diagram illustrating the resulting output voltage of the virtual neutral bridge inverter circuit shown in FIG. 8 according to a non-limiting embodiment of the present disclosure.

Thus, the switch timing scheme not only controls the on/off switching times of the input lead switches 310a/310b, 312a/312b, 314a/314b, but also independently controls the on/off switching times of the neutral lead switches 311a/311b, 313a/313b, and 315a/315b to establish the virtual ground of the motor 300. The resulting output voltage of the virtual neutral bridge inverter circuit 308 is expressed in the quadrant diagram illustrated in FIG. 10. Equation 2 below not only expresses the resulting output voltage provided by the virtual neutral bridge inverter circuit 308, but also the improved voltage benefit provided by the three-phase wye motor 300 and virtual neutral bridge inverter circuit 308 of the present disclosure. The improved voltage benefit (twice the voltage), results in twice the electrical current, which in turn produces twice the torque output.

$$V_{out} = (V_{phA} - V_{phA'}) + (V_{phB} - V_{phB'}) \cdot e^{j\frac{2\pi}{3}} + (V_{phC} - V_{phC'}) \cdot e^{j\frac{4\pi}{3}} \quad \text{Eq. 2}$$

Figure 11A:
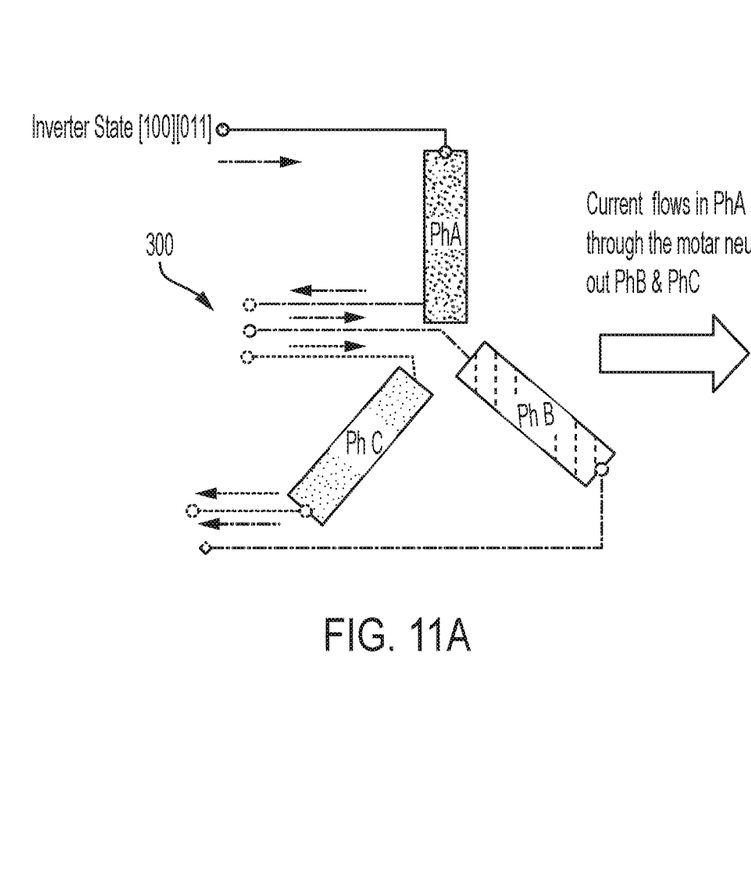
FIG. 11A depicts current flow through a three-phase wye motor of the present disclosure while the virtual neutral bridge inverter circuit shown in FIG. 8 operates in a first state.
Figure 11B:
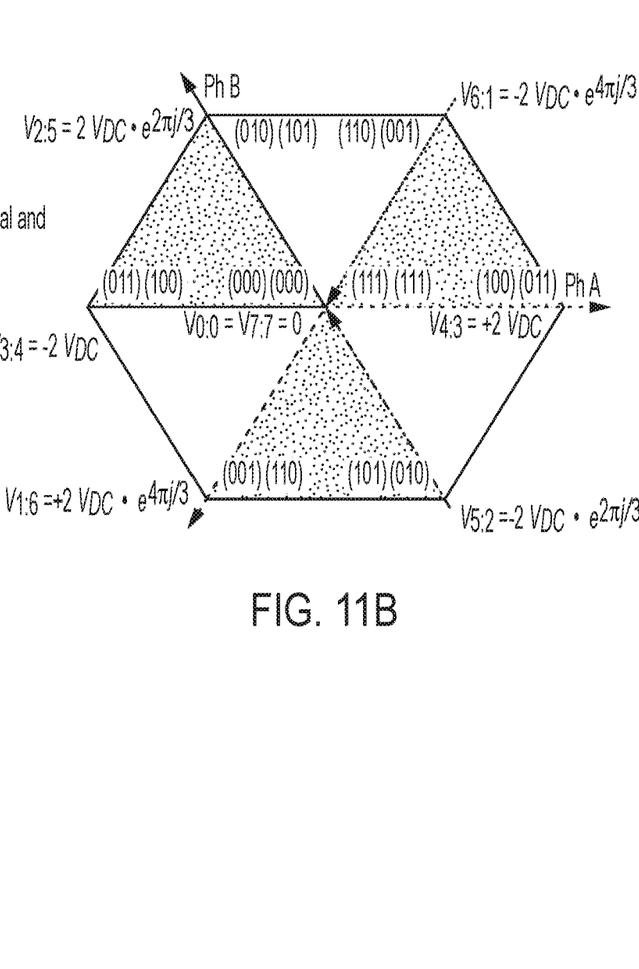
FIG. 11B depicts a quadrant diagram illustrating the resulting output voltage produced by the virtual neutral bridge inverter circuit of the present disclosure shown in FIG. 8 while operating in the first state.

FIG. 11A depicts current flow through a three-phase wye motor 300 of the present disclosure while the virtual neutral bridge inverter circuit 308 operates in a first state. In this example, the first state of the virtual neutral bridge inverter circuit 308 is [100], [011]. Accordingly, current flows through the PhA lead, through the virtual neutral established in the virtual neutral bridge inverter circuit 308, and out of the PhB and PhC leads. The resulting output voltage of the virtual neutral bridge inverter circuit 308 operating according to the dual-vector state [100], [011] is illustrated in the quadrant diagram shown in FIG. 11B.

Figure 12A:
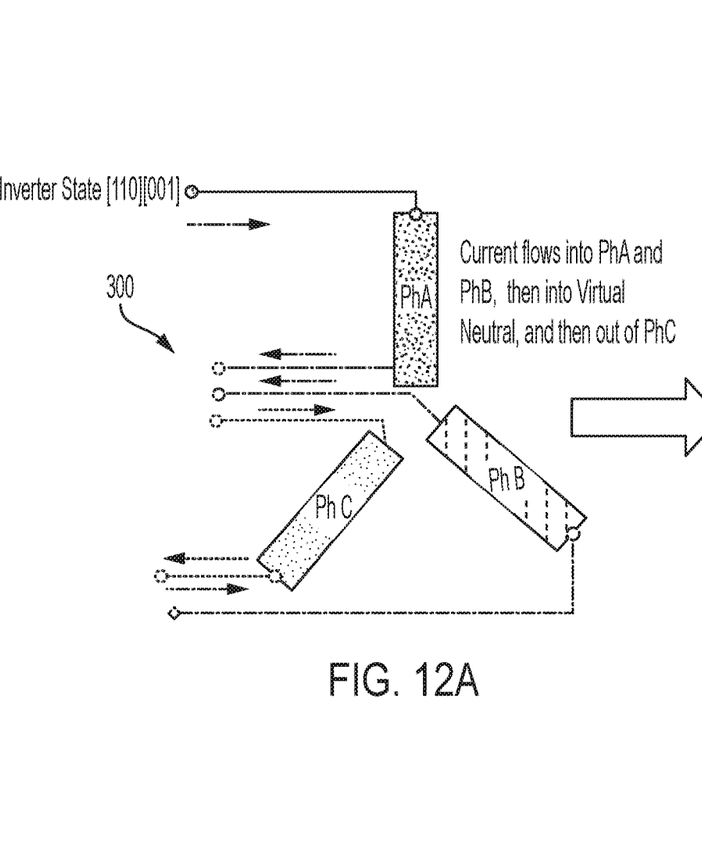
FIG. 12A depicts current flow through a three-phase wye motor while the virtual neutral bridge inverter circuit shown in FIG. 8 operates in a second state.
Figure 12B:
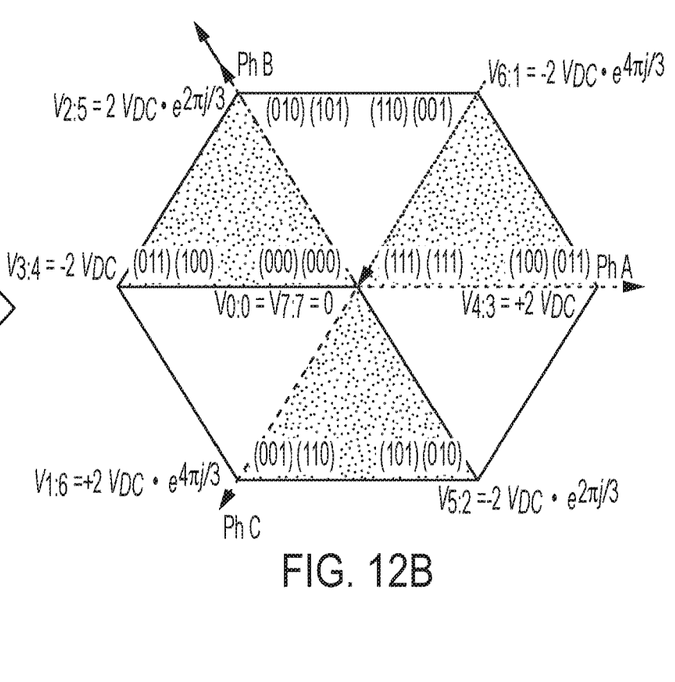
FIG. 12B depicts a quadrant diagram illustrating the resulting output voltage of the virtual neutral bridge inverter circuit shown in FIG. 8 while operating in the second state.

FIG. 12A depicts current flow in the three-phase wye motor 300 while the virtual neutral bridge inverter circuit 308 operates in a second state. In this second example, the second state of the virtual neutral bridge inverter circuit 308 is [110], [001]. In this scenario, current flows into and through Phase A and Phase B and then leaves via the virtual neutral. Current then flows in the virtual neutral, then through and out Phase C. The resulting output voltage of the virtual neutral bridge inverter circuit 308 operating in the dual-vector state [110], [001] is illustrated in the quadrant diagram shown in FIG. 12B.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A motor drive system comprising:
a three-phase motor including a first phase lead including a first phase input end and a first phase neutral end, a second phase lead including a second phase input end and a second phase neutral end, and a third phase lead including a third phase input end and a third phase neutral end, each of the first phase neutral end, the second phase neutral end, and the third phase neutral end separated from one another;
a virtual neutral bridge inverter circuit including a first neutral switch pair connected at a first neutral connection node, a second neutral switch pair connected at a second neutral connection node, and a third neutral switch pair connected at a third neutral connection node,
wherein the first phase neutral end is connected to the first neutral connection node, the second phase neutral end is connected to the second neutral connection node, and the third phase neutral end is connected to the third neutral connection node,
wherein the virtual neutral bridge inverter circuit operates according to a dual-space vector modulation scheme including a first binary set that controls the first, second and third input lead switch pairs, and a second binary set that controls the first, second, and third neutral switch pairs.

2. The motor drive system of claim 1, wherein the virtual neutral bridge inverter circuit further includes a first input lead switch pair connected at a first input connection node, a second input lead switch pair connected at a second input connection node, and a third second input lead switch pair connected at a third input connection node.

3. The motor drive system of claim 2, wherein the first phase input end is connected to the first input connection node, the second phase input end is connected to the second input connection node, and the third phase input end is connected to the third input connection node.

4. The motor drive system of claim 3, further comprising a controller in signal communication with the virtual neutral bridge inverter circuit and configured to output one or more control signals based on the first binary set and the second binary set, the one or more control signals configured to control the on/off switching times of the first, second, and third input lead switch pairs and the first, second, and third neutral switch pairs.

5. The motor drive system of claim 3, wherein the first, second, and third neutral switch pairs are configured to be controlled independently from the first, second and third input lead switch pairs.

6. The motor drive system of claim 4, wherein the virtual neutral bridge inverter circuit is configured to receive a DC link voltage, and
wherein the first, second, and third neutral switch pairs are configured to be actively controlled such that a full amount of the DC link voltage is applied simultaneously across each of the first, second and third phase leads.

7. A virtual neutral bridge inverter circuit configured to control a three-phase motor, the virtual neutral bridge inverter circuit comprising:
a first neutral switch pair connected at a first neutral connection node;
a second neutral switch pair connected at a second neutral connection node; and
a third neutral switch pair connected at a third neutral connection node,
wherein the first neutral connection node is configured to establish electrical connection with a first phase neutral end of a first phase lead included in the three-phase motor, the second neutral connection node is configured to establish electrical connection with a second phase neutral end of a second phase lead included in the three-phase motor, and the third neutral connection node is configured to establish electrical connection with a third phase neutral end of a third phase lead included in the three-phase motor,
wherein the virtual neutral bridge inverter circuit is configured to operate according to a dual-space vector modulation scheme including a first binary set that controls the first, second and third input lead switch pairs, and a second binary set that controls the first, second, and third neutral switch pairs.

8. The virtual neutral bridge inverter circuit of claim 7, wherein the virtual neutral bridge inverter circuit further comprises: a first input lead switch pair connected at a first input connection node;
a second input lead switch pair connected at a second input connection node; and
a third second input lead switch pair connected at a third input connection node.

9. The virtual neutral bridge inverter circuit of claim 8, wherein the first input connection node is configured to establish electrical connection with a first input lead end of the first phase lead, the second input connection node is configured to establish electrical connection with a second input lead end of the second phase lead, and the third input connection node is configured to establish electrical connection with a third input lead end of the third phase lead.

10. The virtual neutral bridge inverter circuit of claim 9, wherein the first, second, and third neutral switch pairs are configured to be controlled independently from the first, second and third input lead switch pairs.

11. The virtual neutral bridge inverter circuit of claim 10, wherein the virtual neutral bridge inverter circuit is configured to receive a DC link voltage, and
wherein the first, second, and third neutral switch pairs are configured to be actively controlled such that a full amount of the DC link voltage is applied simultaneously across each of the first, second and third phase leads.

12. A method of controlling a three-phase motor, the method comprising:
establishing a virtual neutral bridge including a plurality of input lead switch pairs and a plurality of neutral switch pairs;
connecting first, second and third phase leads of the three-phase motor to the plurality of input lead switch pairs and the plurality of neutral switch pairs, the connection between the plurality neutral switch pairs and the first, second and third phase leads establishing a virtual neutral connection of the three-phase motor;
delivering a DC link voltage to the virtual neutral bridge inverter circuit;
controlling the plurality of neutral switch pairs independently from the plurality of input lead switch pairs such that a full amount of the DC link voltage is applied simultaneously across each of the first, second and third phase leads
wherein controlling the plurality of neutral switch pairs comprises operating the virtual neutral bridge inverter circuit according to a dual-space vector modulation scheme including a first binary set that controls the first, second and third input lead switch pairs, and a second binary set that controls the first, second, and third neutral switch pairs.

13. The method of claim 12, wherein establishing the inverter further comprises:
connecting a first neutral switch pair together to establish a first neutral connection node, connecting a second neutral switch pair together to establish a second neutral connection node, and connecting a third neutral switch pair together to establish a third neutral connection node;
connecting a first input lead switch pair together to establish a first input connection node, connecting a second input lead switch pair together to establish a second input connection node, and connecting a third input lead switch pair together to establish a third input connection node;
connecting a first phase neutral end of the first phase lead to the first neutral connection node, connecting a second phase neutral end of the second phase lead to the second neutral connection node, and connecting a third phase neutral end of the third phase lead to the third neutral connection node; and
connecting a first phase input end of the first input lead to the first input connection node, connecting a second phase input end of the second phase lead to the second input connection node, and connecting a third phase input end of the third phase lead to the third input connection node.

14. The method of claim 13, wherein one or more of the binary values included in the first binary set and one or more binary values of the second binary set can be independently varied with respect to one another.

* * * * *